Figure 1:
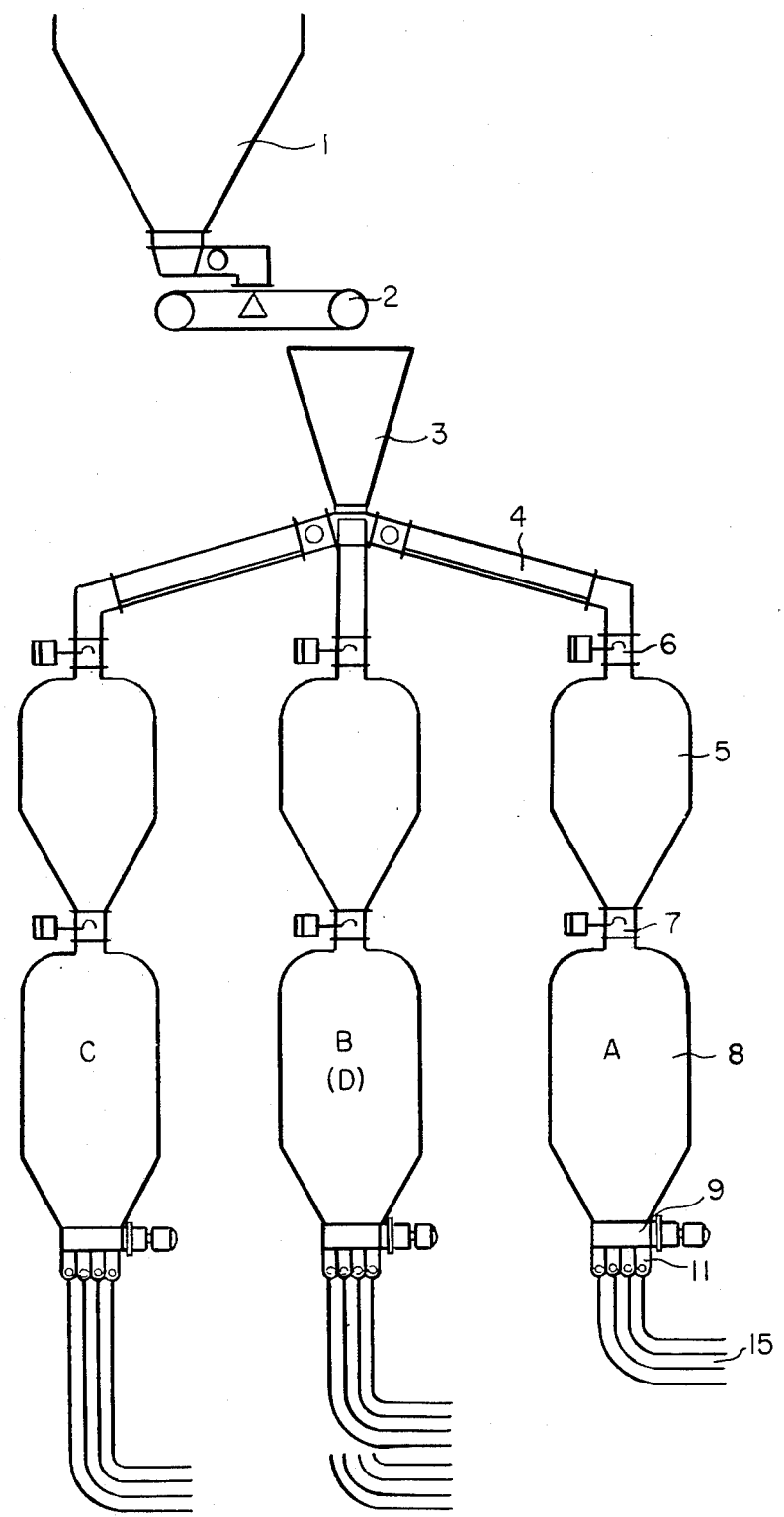

United States Patent [19]

Stamer et al.

[11] 4,049,247

[45] Sept. 20, 1977

[54] EQUIPMENT FOR THE CONTINUOUS PNEUMATIC INTRODUCTION OF COAL DUST

[75] Inventors: Walter Stamer, Hamburg; Frithjof Eichinger, Buxtehude, both of Germany

[73] Assignees: Claudius Peters AG; MAXPETERS Gesellschaft fur Verfahrenstechnik mbH, both of Hamburg, Germany

[21] Appl. No.: 717,005

[22] Filed: Aug. 23, 1976

[30] Foreign Application Priority Data

Aug. 22, 1975 Germany .............................. 2537370

[51] Int. Cl.² ................................................ C21B 7/00
[52] U.S. Cl. .................................... 266/182; 222/194; 302/49
[58] Field of Search .................................... 266/81-85, 266/182, 187, 188, 267, 268; 222/194; 302/3, 49, 52, 53

[56] References Cited

U.S. PATENT DOCUMENTS

| | | | |
|---|---|---|---|
| 3,150,962 | 9/1964 | Pearson | 266/187 |
| 3,178,165 | 4/1965 | Zimmermann | 266/182 |
| 3,301,544 | 1/1967 | Eft et al. | 266/82 |
| 3,371,917 | 3/1968 | Mylting | 266/82 |

*Primary Examiner*—Gerald A. Dost
*Attorney, Agent, or Firm*—Otto John Munz

[57] ABSTRACT

An equipment for the continuous, pneumatic introduction of finely divided materials, in particular coal dust, into several consumption sites, in particular into the tuyeres of blast-furnaces is characterized by combining systems partly known in such manner, that a plurality of double-story vessels is preceded by a distribution system comprising a supply bin with metering conveyor scale and distribution bin. A pressure-resistant bucket-wheel distributor is mounted underneath every pressure-vessel, the buckets of said distributor is multiply subdivided transversely to the axis, and a pressure-pan provided with conveyor-gas hook-up and subdivided into mini-chambers corresponding to the bucket-wheel distributor is mounted underneath each bucket-wheel distributor, the conveyor lines to the consumption sites being connected to the pressure-pan.

5 Claims, 4 Drawing Figures

EQUIPMENT FOR THE CONTINUOUS PNEUMATIC INTRODUCTION OF COAL DUST

The invention relates to equipment for the continuous, pneumatic introduction of finely divided material, especially coal dust, at several consumption sites, in particular into blast-furnace tuyeres.

A number of processes and systems already are known wherein solids are introduced into blast-furnace tuyeres by means of a gas acting as the carrier. For instance the finely divided coal used to blow into the tuyeres is kept in one or more storage or distribution containers under pressure and in a loosened state. When several containers are being used, the constantly pressurized lower container continuously discharges the finely divided materials into the blasting line. An upper container acting in the manner of a floodgate or lock communicates both with the systems at atmospheric pressure used for filling up and with the lower container, the upper one being at least at the same pressure as the lower one. The finely divided coal is made to pass from the lower container into the conveyance lines where they are moved by means of air or another carrier gas to the nozzles in the blast furnace tuyeres. In order to control the rates of supplied coal dust, the pressure difference between the upper end of the storage container and the annular hot wind line of the blast furnace is kept at a constant and predetermined value (German Auslegeschrift No. 1,188,098).

A metering system for the coal-dust/air mixture for the burner lines of a blast furnace is known from German Pat. No. 1,257,055, comprising a distributor, supplied at its bottom with the mixture, from which start the distributor lines, this distributor being equipped with a chamber symmetrical about a vertical axis and closed at the top and requiring no integration, said chamber being of polygonal or circular cross-section and being provided with in an intake at the bottom and a plurality of lateral exhausts arrayed in a common horizontal plane in the chamber wall. The mixture of coal dust and air impinges on the top surface of the chamber and subsequently flows backward and down before exiting from the exhausts leading to the consumption sites.

As regards a known process for loading a furnace with divided solids, especially for loading a blast furnace with carbon particles (German Offenlegungsschrift No. 1,433,328) and equipment for implementing this process, the carbon particles are brought together with a gas flow in a conveyance system, for instance a bucket-wheel lock-gate, for the purpose of pneumatic conveyance, and together with this gas flow are fed to a distribution system in the manner of a Y-pipe, to be split up in said distribution system into a number of lesser flows which as such or else after recombination into larger ones will be supplied through special lines to various areas of the furnace.

The known processes and systems for loading the tuyeres of a blast furnace with coal dust suffer from the drawback they will not reliable ensure that pressure and quantity relationships shall remain constant enough for even distribution to all consumption sites. Again, in spite of preventive measures, the conveyance lines may clog. One of said systems further suffers from the drawback of being very expensive because a conveying or feed system, for instance a bucket-wheel lock-gate, being mounted underneath every coal-dust container, (and) a distribution system in the form of a Y-pipe being provided only behind such feed systems, whereby preferably there will be one feed system for blowing coal into every two tuyeres.

The present invention addresses the task of creating equipment for continuously feeding pneumatically finely divided materials to several consumption sites, improving and simplifying the known equipment, so that loading which is uniform to the highest possible degree becomes feasible using the equipment of the invention.

This problem is solved by the thoughtful combination of systems partly known per se, and in such manner that a plurality of double-story pressure vessels are preceded by a distribution system consisting of supply bin with a metering conveyor scale and distribution bin, in that a pressure-resistant bucket-wheel distributor is mounted underneath every pressure vessel, the buckets of said distributor being multiply subdivided transversely to the axis, and in that a pressure pan or tray provided with conveying-gas connector and subdivided into individual chambers corresponding to the bucket-wheel distributor is mounted underneath every such bucket-wheel distributor and connected to the feeder lines to the consumption sites.

The distribution of the coal dust to the feeder lines according to the invention takes place volumetrically and is independent of the impedance of the feeder line. One advantageously obtains thereby that the same amounts of material are moved even through feeder lines of unequal lengths. As regards the known systems for loading the blast-furnace tuyeres with a mixture of coal-dust and air, uneven distribution of such mixtures takes place because it will not necessarily be provided volumetrically to feeder lines of varying lengths, and this is shown to be the fact in practice. Therefore the (previously known) feeder line with the largest number of bends and of greatest length will receive the least amount of coal-dust/air because of the increased impedance.

The dried, ground coal, that is, the coal dust, according to the arrangement of the equipment of the invention passes from the supply vessel through the metering conveyor scale into a distribution vessel which may assume the role of a buffer and whence several double-story pressure vessels are loaded by means of mechanical or pneumatic conveyors. In conformity with the invention, the upper pressure vessels are filled from the distribution vessel sequentially, each pressure vessel being equipped with a bin level-display so as to show fullness (when achieved). The sequential filling of the upper pressure vessels however may also take place in such manner in conformity with the invention that every batch weighed by the metering conveyor scale is fed through the distribution bin to the particular upper pressure vessel. The sequential filling is superior with respect to parallel filling of the upper pressure vessels because ensuring maximum uniformity in filling the individual pressure vessels.

Loading and emptying the double-story pressure vessels takes place in a manner known per se, for instance as indicated in German Auslegeschrift No. 1,188,098.

In conformity with a further characteristic of the invention, there is continuous control of the rpm of the bucket-wheel distributor as a function of the rate of the metering conveyor-type scale. Bucket-wheel distributors with subdivision of the buckets into individual chambers transversely to the axial direction are basically known, but so far have not yet been used in the present domain of application. The size of the individual chambers may be so selected that varying volumes will be chosen for the individual chambers as a function of the flow properties of the materials to be delivered in order to so compensate differences in flow properties determined by boundary effects and thus to achieve in the end uniform loading of the individual chambers.

A pressure pan provided with a conveyor-gas hook-up is located underneath every bucket-wheel distributor and preferably is combined with same into one equipment-unit; such pan also is provided with a subdivision into chambers in the manner of the bucket-wheel distributor. A number of feeder lines corresponding to the number of individual chambers extend from the pressure pan to the tuyeres of the bustle-pipe the blast furnace.

According to the invention, the injection sites of the feeder lines of the double-story pressure vessels are in an offset arrangement at the periphery of the blast-furnace bustle pipe. The coal-dust exhausts of the feeder lines are correspondingly so distributed on the tuyeres of the blast-furnace bustle-pipe that for instance for six pipes for every double-story pressure-vessel, the injection sites are offset by 6° × 60°. One obtains in this manner that the injection of the mixture of coal dust and air may be continued when there is a failure of one pressure-vessel when operating with several such, and that furthermore sufficiently uniform loading with respect to the entire periphery of the blast-furnace bustle-pipe remains assured.

Figure 2:
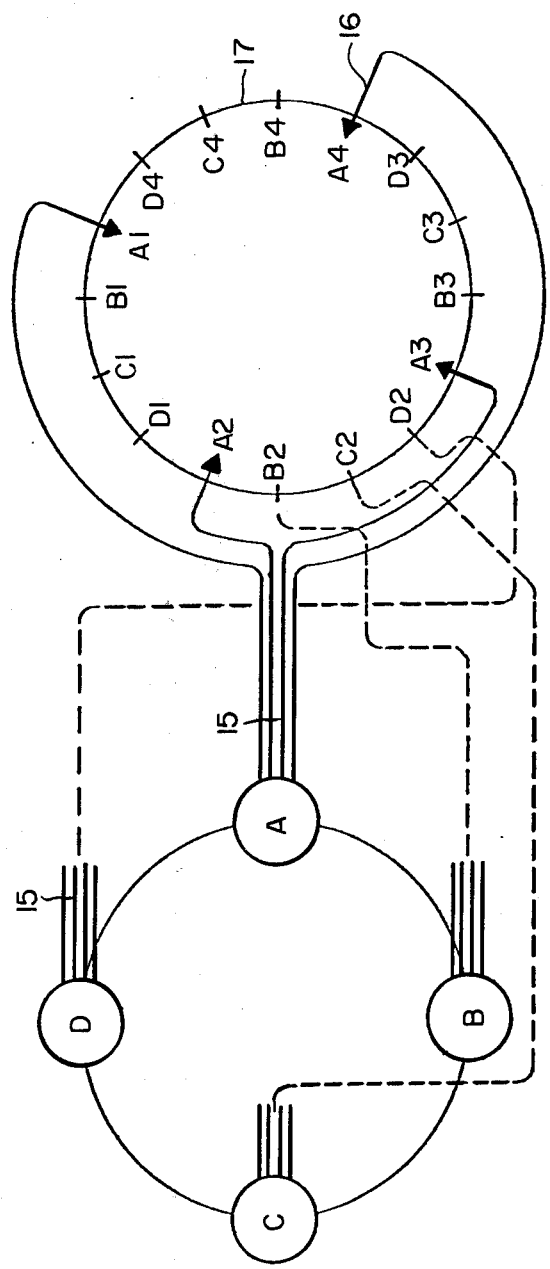
Figure 4:
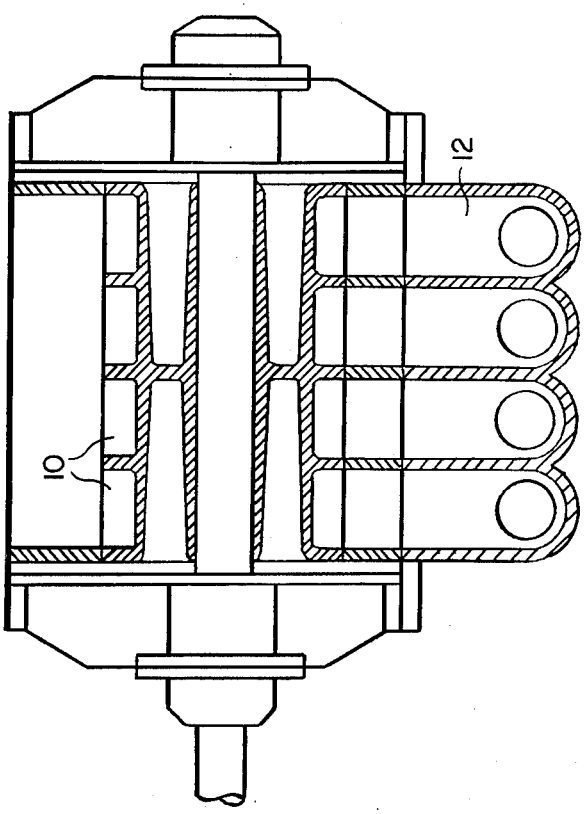
Figure 3:
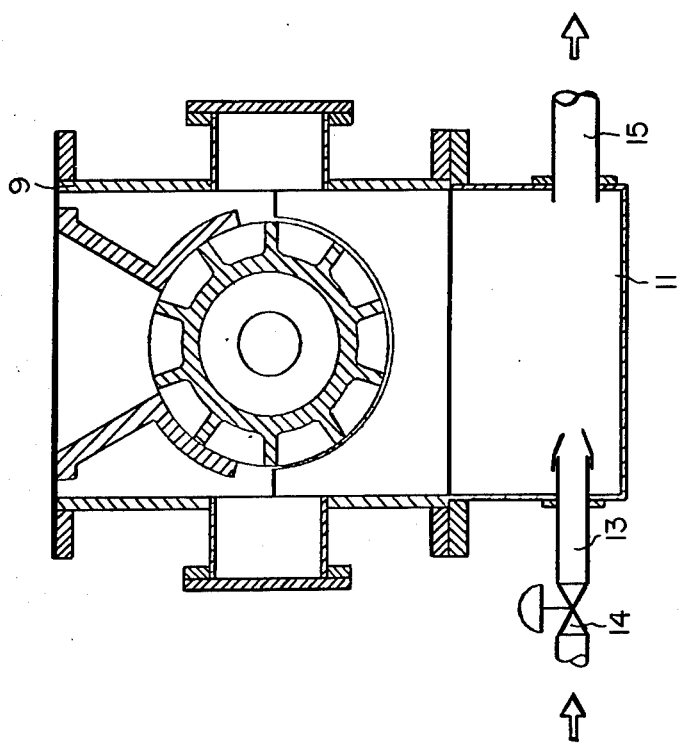

The drawing shows an embodiment of the equipment of the invention as used for introducing coal dust into the tuyeres of a blast furnace; it represents diagrammatically FIG. 1, the injection equipment in section, as a flow diagram;

FIG. 2, a top view of the flow schematic with blast-furnace bustle-pipe;

FIG. 3, the details of a bucket-wheel distributor with the pressure-pan in cross-section; and FIG. 4, a bucket-wheel distributor with pressure-pan as in FIG. 3, in lengthwise section.

The equipment consisting of a combination of individual systems is indicated in FIGS. 1 and 2. The double-story pressure-vessels A,B,C and D are sequentially filled, though in continuous manner, from a supply bin 1 holding ground, dry coal-dust passing through metering conveyor scale 2 and a distribution bin 3 with connected conveyors 4.

Upon opening valve 6, coal dust is fed at atmospheric pressure to the particular upper vessel 5 of a double-story pressure-vessel. Valve 7 between upper vessel 5 and lower vessel 8 is closed while the upper vessel is being filled.

Announcing the filled state of the upper vessel may be obtained by means of a bin-state display on the distribution bin (not shown), so that then the next upper vessel may be filled by means of the corresponding conveyor.

It is possible too to so undertake the sequential loading of the upper vessels that the metering conveyor scale will feed the distribution bin only with the particular batch required for a given upper vessel.

After filling the upper vessel and closing valve 6, the vessel is brought to the same pressure as the particular lower vessel 8 operating in continuous discharge, by supplying compressed gas from above. Upon opening a pressure balancing valve (not shown) between the two vessels, valve 7 opens and the contents of the upper vessel are drained by free fall into the lower one. The lower vessel during this time keeps the required operational pressure (excess pressure).

A pressure-resistant bucket-wheel distributor 9 is located underneath the particular lower vessel 8; said distributor may be controlled continuously. The rpm of bucket-wheel distributor 9 and hence the distributed amounts of conveyed material are automatically controlled as a function of the distribution rates from metering conveyor scale 2, though manual fine adjustment also is feasible.

As shown by FIGS. 3 and 4, each chamber of the bucket-wheel distributor 9 is subdivided into several mini-chambers 10 transversely to the axis, so that several (four in the embodiment) separate flows of dust, volumetrically equal, issue underneath the distributor.

Pressure pan 11 (FIG. 3) is built underneath bucket-wheel distributor 9 and is provided with a corresponding chamber subdivision 12 as in the said distributor. Every mini-chamber 12 is equipped with a conveyor-gas hook-up 13 with gas-flow rate control 14. A conveyor line 15 leading to the particular tuyere 16 of the blast-furnace bustle-pipe 17 is located opposite the conveyor-gas hook-up and in every mini-chamber 12 of the pressure pan.

The number of the double-story pressure-vessels depends on the number of tuyeres and of chamber subdivisions of the bucket-wheel distributor. If there are 28 tuyeres, use may be made for instance of seven double-story pressure-vessels each with four conduits; if there are 30 tuyeres, use may be made of six double-story pressure-vessels with five conduits. The embodiment of FIGS. 1 and 2 shows only four double-story pressure-vessels each with four conduits for 16 tuyeres.

We claim:

1. Equipment for the continuous, pneumatic introduction of finely divided materials, in particular coal dust, into several consumption sites, in particular into the tuyeres of blast-furnaces, characterized by combining systems partly known per se in such manner that a plurality of double-story vessels is preceded by a distribution system consisting of a supply bin (1) with metering conveyor scale and distribution bin (3), in that a pressure-resistant bucket-wheel distributor (9) is mounted underneath every pressure-vessel (8), the buckets of said distributor being multiply subdivided (10) transversely to the axis, and in that a pressure-pan (11) provided with conveyor-gas hook-up (13) and subdivided into mini-chambers (12) corresponding to the bucket-wheel distributor is mounted underneath each bucket-wheel distributor, the conveyor lines (15) to the consumption sites being connected to said pressure pan.

2. Equipment as defined in claim 1, characterized in that the rpm of the bucket-wheel distributor (9) is continuously controlled as a function of the metering conveyor scale rate.

3. Equipment as defined in claim 1, characterized in that the upper pressure vessels (5) are filled sequentially from the distribution bin (3) and in that every pressure-vessel is provided with a bin-state display announcing fullness.

4. Equipment as defined in claim 1, characterized in that filling the upper pressure-vessels (5) takes place sequentially and in that each time a batch weighed by the metering conveyor scale (2) is fed through the distribution bin (3) to the particular upper pressure vessel (5).

5. Equipment as defined in claim 1, characterized in that for coal dust being introduced into the tuyeres (16) of blast furnaces, the injection sites of the conveyor lines (15) coming from the double-story pressure-vessels are arrayed offset along the periphery of the blast-furnace bustle-pipe (17).

* * * * *